United States Patent
Rane et al.

(10) Patent No.: US 12,511,408 B2
(45) Date of Patent: Dec. 30, 2025

(54) TECHNIQUES TO PROCESS THREE-DIMENSIONAL OBJECT FILES WHILE MAINTAINING PRIVACY

(71) Applicant: Genesee Valley Innovations, LLC, Santa Clara, CA (US)

(72) Inventors: Shantanu Rane, Palo Alto, CA (US); Alejandro E. Brito, Mountain View, CA (US); Morad Behandish, San Mateo, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 97 days.

(21) Appl. No.: 18/501,906

(22) Filed: Nov. 3, 2023

(65) Prior Publication Data

US 2025/0148092 A1 May 8, 2025

(51) Int. Cl.
*G06F 21/60* (2013.01)
*G06F 3/12* (2006.01)
*H04L 9/00* (2022.01)

(52) U.S. Cl.
CPC .......... *G06F 21/602* (2013.01); *G06F 3/1222* (2013.01); *G06F 3/1238* (2013.01); *H04L 9/008* (2013.01)

(58) Field of Classification Search
CPC .... G06F 21/602; G06F 3/1222; G06F 3/1238; G06F 21/6209; H04L 9/008
See application file for complete search history.

(56) References Cited

U.S. PATENT DOCUMENTS

| | | | |
|---|---|---|---|
| 2016/0185044 A1* | 6/2016 | Leonard | G06F 30/00 700/98 |
| 2017/0372284 A1* | 12/2017 | Levy | G06F 16/258 |
| 2019/0303620 A1* | 10/2019 | Jacobs, II | G06F 21/6245 |
| 2020/0250322 A1* | 8/2020 | Sayers | G06F 21/608 |
| 2020/0324481 A1* | 10/2020 | Sayers | B29C 64/386 |
| 2020/0326683 A1* | 10/2020 | Oligschlaeger | G06F 21/608 |

* cited by examiner

*Primary Examiner* — Patrice L Winder
(74) *Attorney, Agent, or Firm* — Mueting Raasch Group

(57) ABSTRACT

The present disclosure provides techniques for finding non-printable features in a three-dimensional (3D) printable object. An example method includes receiving a first encrypted file and a request to process the first encrypted file to identify non-printable features of a 3D printable object, wherein the first encrypted file is an encrypted complement of an object file that comprises a specification of the 3D printable object. The method also includes computing a first encrypted Minkowski sum of the first encrypted file and an encrypted minimum feature file to generate an encrypted intermediate file and sending the encrypted intermediate file. The method also includes receiving a second encrypted file that comprises an encrypted complement of the encrypted intermediate file and computing a second encrypted Minkowski sum of the second encrypted file and the encrypted minimum feature file to generate an encrypted result file that describes non-printable features of the 3D printable object.

20 Claims, 10 Drawing Sheets

TECHNIQUES TO PROCESS THREE-DIMENSIONAL OBJECT FILES WHILE MAINTAINING PRIVACY

TECHNICAL FIELD

Implementations of the present disclosure relate to additive manufacturing.

BACKGROUND

Additive manufacturing (often known as 3D printing) enables the production of structures that are complicated in shape and not achievable by subtractive manufacturing methods. For example, hollow structures that are expensive or difficult to achieve in machining processes (i.e., removal of materials by turning, drilling, and milling) may be created layer by layer in additive manufacturing. Many forms of additive manufacturing make use of transforming matters from one state to another, such as from liquid to solid, by chemical reactions, or by heat (e.g., melting materials at specific locations and solidifying when cooled). Hybrid Manufacturing (HM) incorporates additive and subtractive manufacturing technologies in a multi-modal manufacturing process that combines the advantages of both manufacturing processes.

In some cases, a designer may want to ensure that the object model can be printed and will achieve the objectives of the designer. For example, if the object model contains very small features, some of those features may not be printable depending on the specifications of the 3D printer to be used to fabricate the part. Additionally, in some cases, the part may be intended to underdo additional processes after the part has been 3D printed. In such cases, the designer may want to confirm that the manufacturing tools used in these post-printing processes will be able to access certain external regions of the part. The designer may also want to confirm that the printed part will successfully interface or mate with other parts of a larger assembly.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

Like numerals indicate like elements.

DETAILED DESCRIPTION

Figure 1:
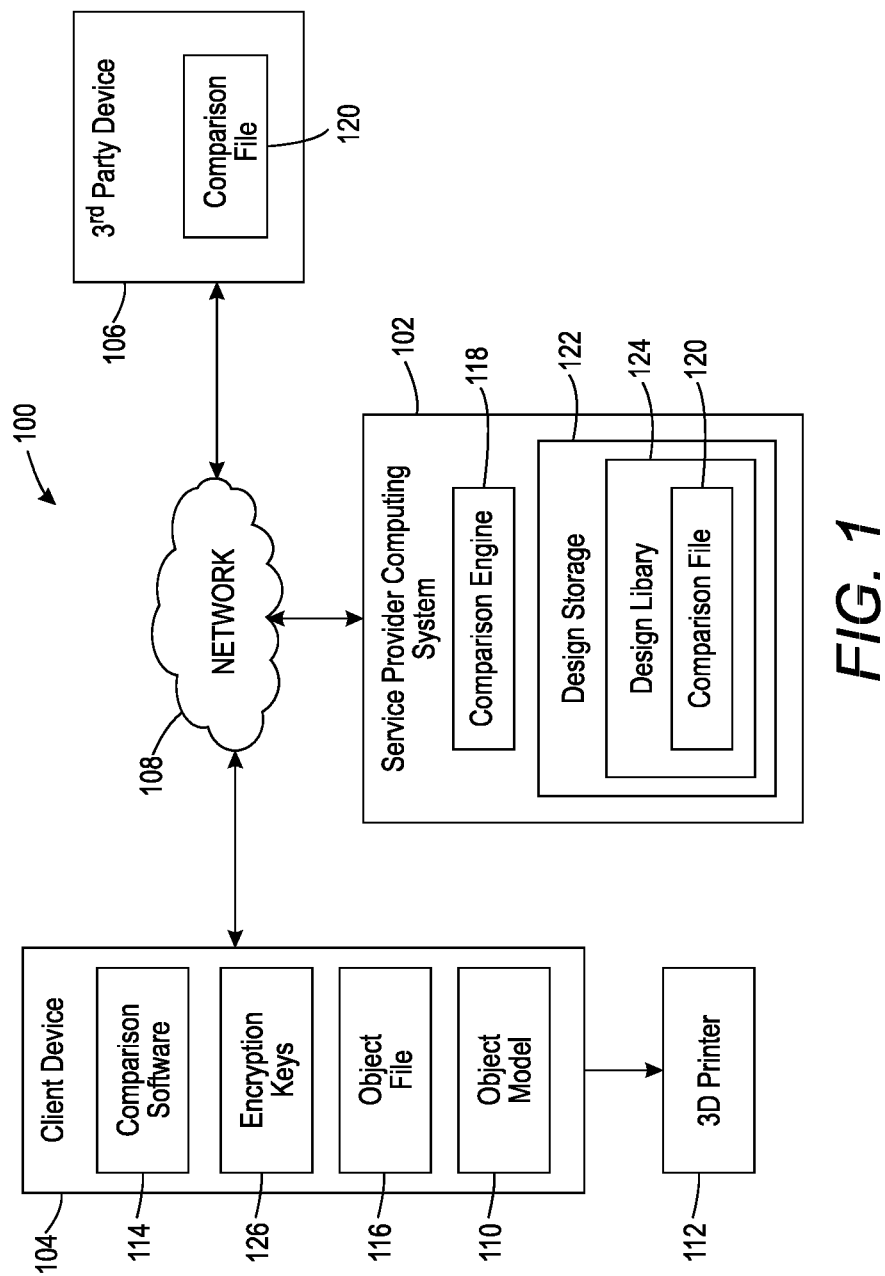
FIG. 1 illustrates a block diagram of a system to implement a protocol for processing a 3D object model in a privacy-preserving manner, in accordance with some embodiments of the present disclosure.

The present disclosure provides various techniques for identifying characteristics of a 3D object model used in 3D printing. The 3D object model is a digital file that can be processed and converted into instructions that direct a 3D printer to fabricate an object referred to herein as a 3D printed part or simply a part. The identified characteristic may be any characteristic that helps the designer to determine whether the object model can be successfully printed and whether the resulting 3D printed part will satisfy the objectives of the designer. For example, the designer may want to ensure that the part will successfully interface or mate with other parts of a larger assembly or confirm that certain external regions of the part will be accessible by a tool. Depending on the type of analysis to be performed, the user's computing device may not have the processing resources to perform the large number of computations involved. For this, and other reasons, it may be useful to send the object model to a service provider that is able to process the object model to identify the intended characteristic and generate results that can be returned to the user. However, if the object model contains proprietary information, the user may be uncomfortable sharing the object model with an untrusted service provider.

In some cases, the user may want to compare their 3D model with a 3D model owned by a third party. For example, the design of the tool or other part may be the intellectual property of a third party that is collaborating with the user on a particular project. In such situations, both parties may want to keep their 3D models confidential from each other, while still being able to compare their 3D models to identify compatibility issues.

The present disclosure describes techniques that enable a user to obtain an analysis of a 3D object model from a service provider in a privacy-preserving manner such that the service provider does not have access to the characteristics of the object represented by the 3D object model. The user may send an object file derived from the 3D object model to the service provider, which performs a privacy-preserving computation that provides some type of evaluation or analysis of the 3D object model. The service providers computing system uses homomorphic encryption so that computations performed on the object file by the service provider are performed within the encrypted domain, which prevents the service provider from having access to the underlying unencrypted data. Both the object file provided to the service provider and the results file returned to the user are encrypted and can only be decrypted by a private key in possession of the user.

Homomorphic encryption is a type of encryption that enables computations to be performed on the encrypted data without first decrypting it. The resulting computations are in an encrypted form which, when decrypted, produces the same output that would have been produced if the operations had been performed on the unencrypted data. There are various types of homomorphic encryption techniques. Homomorphic encryption techniques that support unlimited numbers of multiplication and addition operations in the encrypted domain are referred to as fully homomorphic. Homomorphic encryption techniques that support only one type of operation, e.g., multiplication or addition, in the encrypted domain are referred to as partially homomorphic. Homomorphic encryption techniques that support both multiplication and addition operations in the encrypted domain, but only a limited number of operations, are referred to as somewhat homomorphic. As an example, there exist somewhat homomorphic encryption schemes that allow the computation of low-degree polynomials over encrypted data.

The file to be sent to the service provider computing system may be referred to herein as an object file. In some embodiments, the object file may be derived from a 3D object model such as an STL file, as described further in relation to FIG. 1. The manipulation of the object file may involve comparing the user's object file to another file referred to herein as the comparison file. For example, the comparison file may be derived from a 3D object model that represents a tool or other part in an assembly. In some embodiments, the service provider may store a collection of comparison files to be compared to the user's object file. In other embodiments, the comparison file may be received by the service provider from a third party, who may want to keep the comparison file private from the service provider and/or the user. For example, the user may want to perform a comparison between the user's object file and a tool specification owned the third party. In such embodiments, the service provider receives both the user's object file and the comparison file in encrypted form, thereby maintaining the privacy of both parties. This enables cooperation between parties without requiring the parties to share their designs with each other or the service provider.

The user can specify the type of comparison to be performed, such as a distance comparison, collision or overlap detection, distance detection, non-printable feature detection, and others. Each of these comparisons may involve different types of mathematical manipulations. In some embodiments, the user and the service provider perform a Minkowski sum protocol to achieve the desired result. The Minkowski sum protocol operates in such a way that the service provider can provide a variety of comparisons through a Minkowski summation of the object file and the comparison file. Depending on the type of comparison to be performed, additional operations may also be performed (by the user's computing device, the service provider computing system, or the third-party computing device) to achieve the desired result, with the Minkowski sum protocol serving as a primitive protocol that serves as the basis of various types of comparison operations. In other words, each of these various types of comparison is formulated as a set of procedures wherein the Minkowski sum is the primitive protocol performed by the service provider computing system. Other primitive protocols are possible within this framework.

The techniques described herein improve the operation of a computing system by enabling a service provider's computing system to evaluate 3D object files of their customers for a variety of purposes (printability, tool access, part compatibility) while preserving the privacy of their customer's proprietary intellectual property. Operations that may not have been practical to perform on the user's computing device can now be offloaded to the service provider's system, which has the processing resources needed to complete the task in a reasonable amount of time.

FIG. 1 illustrates a block diagram of a system to implement a protocol for processing a 3D object model in a privacy-preserving manner, in accordance with some embodiments of the present disclosure. As shown in FIG. 1, the system 100 includes a service provider computing system 102 coupled to one or more computing devices, such as a client device 104 and a third-party device 106, through a network 108.

The service provider computing system 102 may include hardware such as processing devices, volatile memory, persistent data storage devices, networking equipment, and other hardware devices. The service provider computing system 102 may be may a distributed set of devices, including any suitable type of computing devices or machines that have programmable processing resources including, for example, server computers, desktop computers, laptop computers, tablet computers, etc. The service provider computing system 102 may comprise a single machine or may include multiple interconnected machines (e.g., multiple servers configured in a cluster). For example, the service provider computing system 102 may be implemented in a cloud computing system. Similarly, the client computing device 104 and third-party computing device 106 may include hardware such as processing devices, volatile memory, persistent data storage devices, networking equipment, and other hardware devices.

The client device 104 may include an object model 110. The object model 110 describes a 3D object that may be capable of being printed by a 3D printer 112. The object model 110 may be any suitable file type, such as a computer-aided design (CAD) model (e.g., in AutoCAD™, Solidworks™, STEP, VRML, IGES, or DXF formats), an STL model, or other point cloud models (e.g., .obj, .x3d, files and the like). In some embodiments, the client computing device 104 may include 3D modeling software to enable the user to generate and/or manipulate the object model 110. The client computing device 104 may also store or otherwise have access to a collection of object models that can be downloaded, viewed, and altered via the 3D modeling software.

The client device 104 may also include comparison software 114, which allows the user to access processing services available through the service provider computing system 102 for identifying a characteristic of the object model 110. The comparison software 114 can send processing requests to the service provider computing system 102, encrypt files, and perform calculations in coordination with the service provider computing system 102 to achieve the requested processing result.

In some embodiments, the comparison software 114 may convert the object model 110 to an object file 116 that has a data format suitable for further processing as described herein. In some embodiments, the object file 116 is a 3D array of voxels that represents the 3D object specified by the object model 110. A 3D array of voxels may also be referred to as a third order tensor. Embodiments of the present techniques may also be implemented with first order tensors (one-dimensional arrays) and second order tensors (two-dimensional arrays). The numbers in the one-dimensional or multidimensional array may be referred to as the components of the tensor.

If the object model 110 in not in an acceptable format, the object model 110 may be processed to generate the object file 116. For example, if the object model 110 is an STL file, the object model 110 will be represented by a listing of vertices corresponding to triangulated surfaces of the object. The object model 110 may also include metadata, such as file name, author, modification data, and others. Processing the object model 110 to generate the object file 116 may include converting the object representation to an equivalent tensor representation and eliminating metadata. In some embodiments, the object file 116 may be generated by the comparison software 114 in response to a processing request initiated by the user.

The service provider computing system 102 includes a comparison engine 118, which may be implemented as hardware or a combination of hardware and software (e.g., one or more processing devices programmed to execute functions described herein). The comparison engine 118 is configured to process the object file 116 in accordance with the request received from the client computing device 104. The comparison engine 118 implements the processing protocol used to process the object file 116 and performs the encrypted computations that form the basis of the primitive protocol while maintaining the privacy of the client's data. The comparison engine 118 processes the object file 116 by comparing the object file 116 to another file, referred to herein as the comparison file 120. Comparing the object file 116 to the comparison file 120 means computing a function of the object file 116 and the comparison file 120, for example, the Minkowski sum of the object file 116 and the comparison file 120.

The comparison file 120 may be a tensor of the same order as the object file 116, e.g., another 3D tensor or array of voxels. Comparison files 120 may be similarly derived from 3D object models by the service provider computing system 102 or the third-party device 106.

The service provider computing system 102 may include, or have access to, a storage device 116 that maintains a design library 114. The design library 114 may include various object specifications that can be used as comparison files 120 for processing the object file 116 received from the client device 104. For example, the design library 114 may include comparison files 120 representing a variety of 3D parts, fabrication tools, or specifications for a variety of 3D printers. In some embodiments, the comparison file 120 may be provided by the third-party computing device 106.

The client computing system 104 can send a processing request to the service provider computing system 102. To ensure that the service provider is not able to access the object specification contained in the object file 116, the client computing system 104 first encrypts the object file 116 before sending it to the service provider computing system 102. The object file 116 may be encrypted using any suitable homomorphic encryption technique, including fully homomorphic encryption, partially homomorphic encryption, and somewhat homomorphic encryption. Somewhat homomorphic encryption techniques will generally use fewer processing resources compared with fully homomorphic encryption, and may therefore be preferred in some cases, depending on the type of computations to be performed on the encrypted files. The encryption scheme uses a pair of encryption keys 120 referred to as a public key and a private key. Files can be encrypted using the public key but can only be decrypted using the corresponding private key. Thus, the public key can be shared without losing privacy, whereas the private key is held by the client device 104 and is not shared.

The encryption of the object file 116, the packaging of the request, and the communications with the service provider computing system 102 may be performed by the comparison software 114. Additionally, mathematical computations to be performed by the client device 104 in accordance with the processing protocol may also be performed by the comparison software 114. As described further in relation to FIGS. 2-5, the computations performed by the client device 104 are coordinated with the computations performed by the comparison engine 118 on the service provider computing system 102. The type and sequence of calculations may vary depending on the type of comparison to be performed. In some embodiments, the comparison software 114 may be downloaded from the service provider computing system 102.

The processing request sent from the client device 104 may include the encrypted object file 116, the public key used to encrypt the object file 116, and a process identification describing the type of comparison to be performed. For example, the process identification may describe a request to process the object file 116 to determine whether there are any parts that are too small to be printed by the 3D printer 112. The request may also indicate a minimum printable size or a particular printer model that can be used to determine the minimum printable size. In some embodiments, the process identification may describe a request to process the object file 116 to determine what regions of the printed object would be accessible by a tool, such as a subtractive manufacturing tool. The request may also identify a particular tool to be used for the comparison. Other types of processes may also be requested, such as determining whether the printed object would collide with another part of the same assembly, determining the amount of clearance between the parts, and others. The comparison file 120 may be obtained based on the process identification received from the client device 104. For example, the process identification may identify a particular tool that has a corresponding design specification in the design library 114, which can be retrieved from storage and used as the comparison file 120.

In some embodiments, the comparison file 120 is received from a third-party computing device 106. For example, the user may want to collaborate with the third party on a joint project which involves one or more objects designed by the third party, such as a tool, or another part of an assembly, for example. In such examples, the client device 104 may send the public key to the third-party device 106, which encrypts the comparison file 120 before sending it to the service provider computing system 102. In this way, the third party is also able to maintain privacy of their designs as long as the service provider does not provide the encrypted comparison file 120 to the client device 104. In some cases, the third party may not be concerned about preserving the privacy of their designs, in which case the comparison file 120 may be sent from the third-party device unencrypted, and the service provider computing system 102 can encrypt the comparison file 120 to enable computations to be performed in the encrypted domain.

Once the request is received by the service provider computing system 102 a processing protocol is initiated. The processing protocol may include various computations that are performed by the comparison engine 118 in concert with the client device 104. If the comparison file 120 is not already encrypted, the service provider computing system 102 first encrypts the comparison file 120 using the public key provided by the client device 104.

Among other possible operations, the comparison engine 118 may compute an encrypted Minkowski sum of the encrypted object file 116 and the encrypted comparison file 120. The Minkowski sum is computed in the encrypted domain, i.e., without decrypting the files. In some embodiments, all requests are processed using the Minkowski sum as a basic unit of computation. Thus, each request is formulated to use the Minkowski sum in addition to one or more additional manipulations, which may be performed by the client device 104 or the service provider computing system 102. For example, the processing protocol may involve the passing of intermediate data sets back and forth between the client device 104 and the service provider computing system 102 before the final result is obtained. Example processing protocols are described in relation to FIGS. 2-5.

The Minkowski sum of two tensor files A and B (also be referred to as dilation or convolution of A and B) can be formed by adding each element in A to each element in B. The Minkowski sum may also be computed by converting each tensor file to the frequency domain and computing the element wise product of the tensors. In embodiments, the comparison engine 118 may compute the Minkowski sum in the spatial domain or the frequency domain. If the Minkowski sum is computed in the frequency domain, the object file 116 and the comparison file 120 may be converted to the frequency domain using a Fourier transform algorithm, e.g., Discrete Fourier Transform (DFT), Fast Fourier Transform (FFT), etc. The converted object file 116 and the converted comparison file 120 may be tensors with floating-point precision up to a specified number of significant digits. The frequency domain versions of the object file 116 may be computed by the client device 104 (e.g., prior to being encrypted) or by the service provider computing system 102 in the encrypted domain, depending on the details of a specific implementation such as the type of homomorphic encryption used.

The final result of the processing request is received by the client device 104 in the form of an encrypted results file. The results file may then be decrypted by the client device 104 and may also be subject to further processing. For example, if the decrypted results file is in the frequency domain, the client device 104 can convert the file to the spatial domain using an inverse Fourier transform. Additionally, the decrypted results file may be used to generate a 3D representation of the object, which can be displayed to the user through a graphical user interface (GUI). Features of the 3D object may be represented differently depending on the type of processing request. For example, unprintable features of the 3D object may be highlighted or features that are accessible by a tool may be highlighted.

Once the user has received the results, the user may modify the corresponding 3D object model 110 to address potential printing issues and/or select the corresponding object model 110 for printing by the 3D printer 112. It will also be appreciated that additional processing may be required to transform the 3D object model 110 into a form used by a specific type of 3D printer 112. For example, a program referred to as a slicer may transform the 3D object model 110 from a CAD or STL file to a G-code file.

Figure 2:
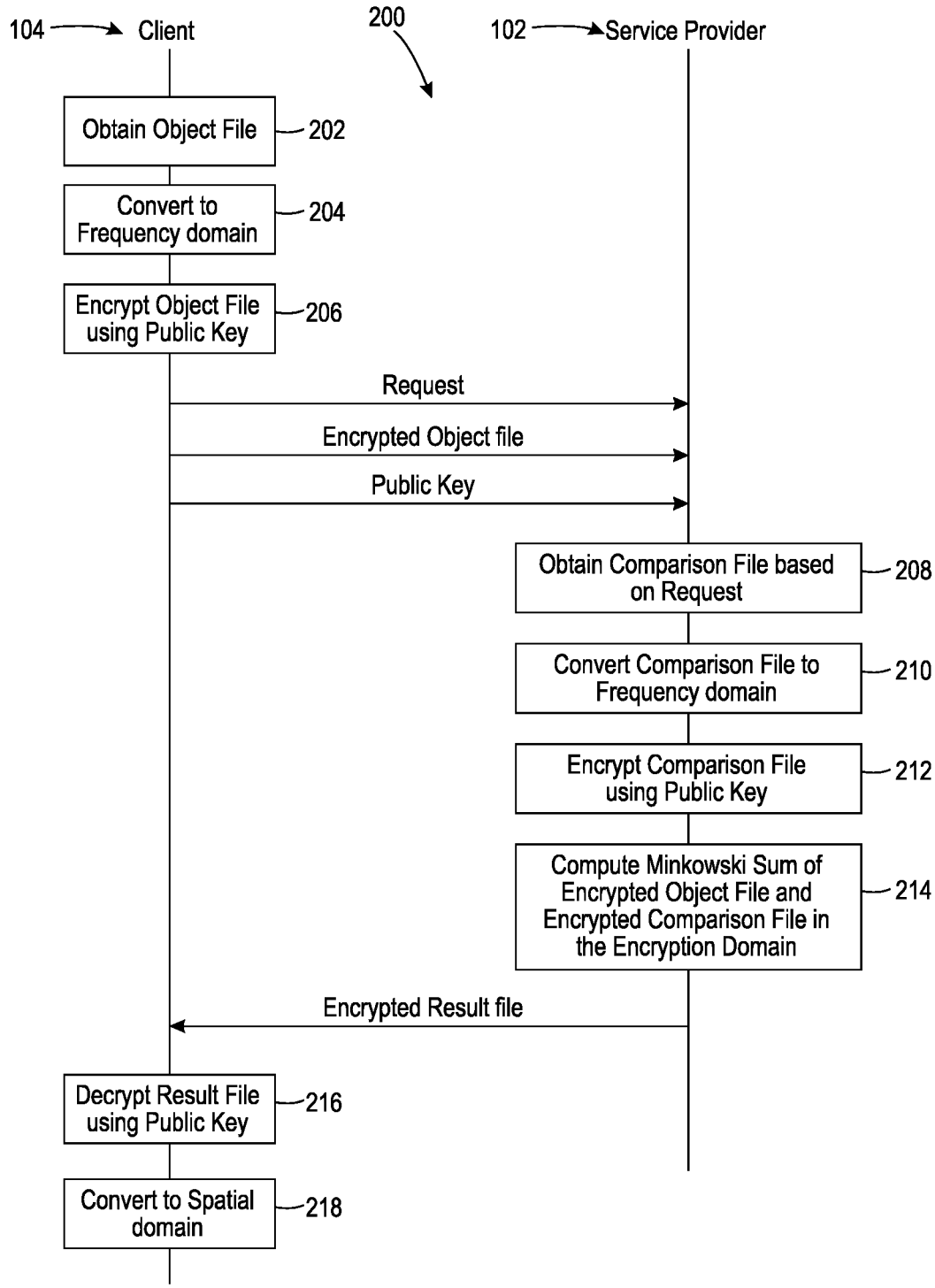
FIG. 2 is a diagram depicting a Minkowski sum protocol between a client device and service provider computing system, in accordance with some embodiments of the present disclosure.

FIG. 2 is a diagram depicting a Minkowski sum protocol between a client device and service provider computing system, in accordance with some embodiments of the present disclosure. With reference to FIG. 1, those processes performed by the client device 104 may be performed by the comparison software 114, and processes performed by the service provider computing system 102 may be performed by the comparison engine 118. It will be appreciated that an actual implementation of the Minkowski sum protocol may involve additional computations depending on the particular characteristic to be computed. More detailed protocols are described in relation to FIGS. 3 and 4. The process may begin at block 202.

At block 202, the client device 104 obtains an object file. The object file may be three-dimension array of voxels representing an object capable of being fabricated by a 3D printer. In some embodiments, the client device 104 converts the object file to a frequency domain representation at block 204. For example, the client device 104 may convert the object file to a frequency domain representation using a Fourier transform such as the Fast Fourier Transform (FFT).

At block 206, the object file is encrypted using the public key of a public-private key pair. Any suitable homomorphic encryption technique may be used.

The client device 104 then sends a processing request to the service provider computing system 102. The processing request may identify a type of process to be performed or a type of characteristic to be identified. Along with the request, the client device 104 also sends the encrypted object file and the public key used to encrypt the object file.

In response to the request, the service provider computing system 102 obtains, at block 208, the relevant comparison file based on the request. The comparison file may be obtained from a storage device of the service provider computing system 102 based on the details of the request. The comparison file may describe a tool specification, a part specification for another part in an assembly, a minimum printable feature, and others.

At block 212, the service provider computing system 102 encrypts the comparison file using the public key received from the client device 104. At block 214, the service provider computing system 102 computes the encrypted Minkowski sum of the encrypted object file and the encrypted comparison file. In the embodiment shown in FIG. 2, the encrypted Minkowski sum E[G] is computed in the frequency domain by computing the element wise product of the encrypted object file E[C] and the encrypted comparison file E[D], which is represented in Equation 1 below.

$$E[G(i, j, k)] = E[C(i, j, k)]E[D(i, j, k)] \qquad \text{Eq. 1}$$

Where i, j, k assume all permissible values within the allocated coordinate space. This leverages the fact that multiplication in the frequency domain is equivalent to computation in the spatial domain, and the fact that the encryption function E(•) is multiplicatively homomorphic. Note that E(•) is also additively homomorphic but that property is not exploited in the relationship described above. The encrypted Minkowski sum E[G], referred to herein as the result file, is then sent to the client device 104.

At block 216, the client device decrypts the result file using the private key. At block 218, the client device converts the decrypted result file to the spatial domain, which is the convolution of the object file and the comparison file.

It will be appreciated that embodiments of the protocol 200 may include additional blocks not shown in FIG. 2 and that some of the blocks shown in FIG. 2 may be omitted. Additionally, the processes associated with blocks 202 through 216 may be performed in a different order than what is shown in FIG. 2. For example, in the embodiment described above, the Minkowski sum is computed in the frequency domain, which is computationally more efficient then computing the Minkowski sum in the spatial domain. However, it will be appreciated that embodiments of the present techniques also include computing the Minkowski sum in the spatial domain. In such embodiments, blocks 204, 210, and 216 can be skipped, and the encrypted Minkowski sum E[G] is computed in the spatial domain by computing the element wise summation of the encrypted object file E[C] and the encrypted comparison file E[D], which is represented in Equation 2 below.

$$E[G(x, y, z)] = \sum_{i,j,k} E[C(i, j, k)] E[D(x-i, y-j, z-k)] \quad \text{Eq. 2}$$

In the above relationship, the coordinates i, j, k, x, y, z all assume all permissible values within the allocated coordinate space. The relationship is identical to spatial-domain convolution of the objects represented by C and D. The relationship makes use of the fact that the encryption function E(•) is additively and multiplicatively homomorphic. This way of computing the Minkowski Sum is an alternative to that taught by Eq. 1, though it is likely to be mathematically more complex.

Additionally, in some embodiments, the object file may be converted to the frequency domain by the service provider computing system 102 (in the encrypted domain) rather than by the client device 104. In such embodiments, blocks 204 and 216 can be skipped, the service provider computing system 102 converts the encrypted object file to the frequency domain prior to computing the Minkowski sum, and converts the result back to the spatial domain before sending the encrypted result file to the client device 102.

Figure 3:
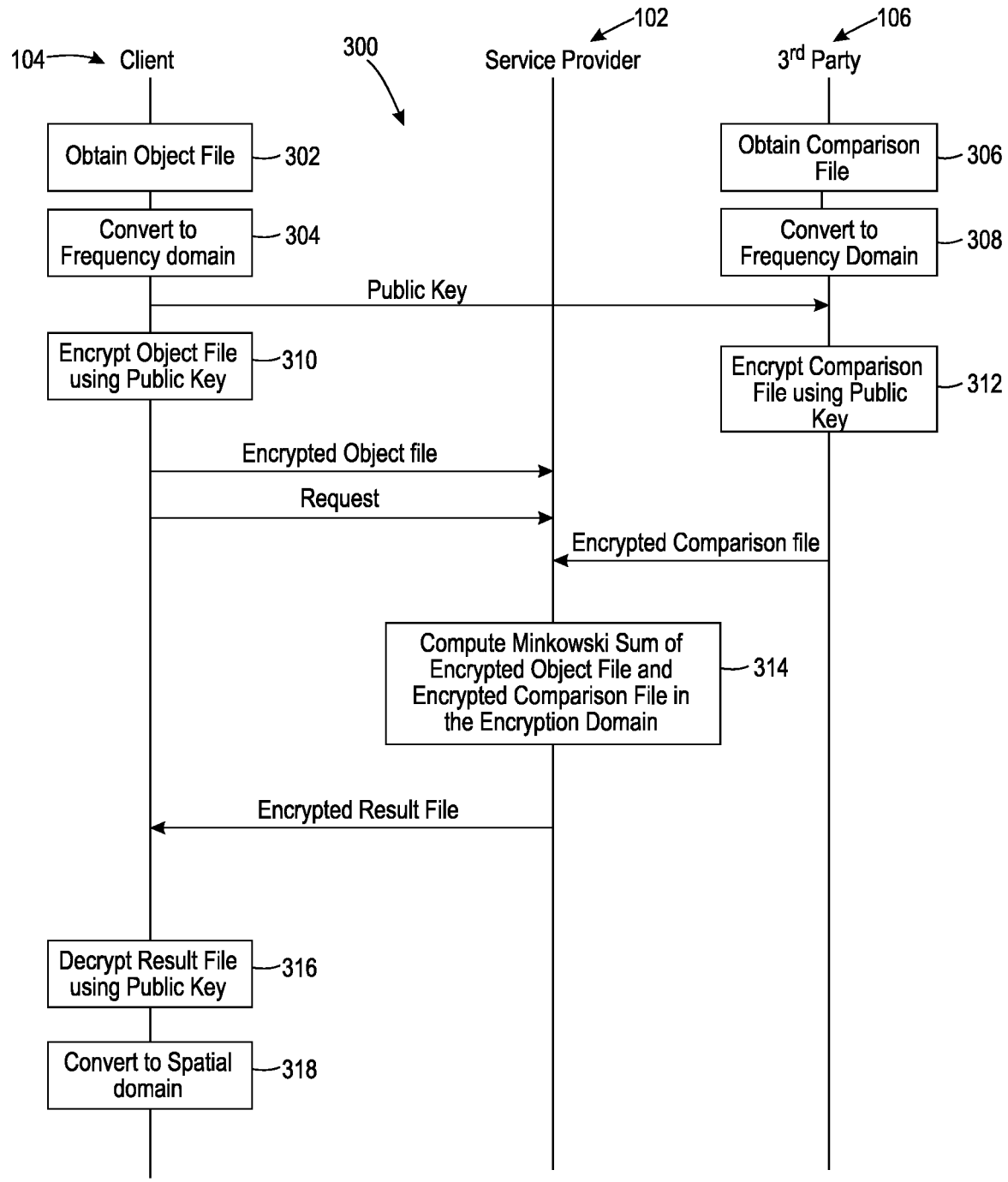
FIG. 3 is a diagram depicting a Minkowski sum protocol between a client device, service provider computing system, and a third-party computing device, in accordance with some embodiments of the present disclosure.

FIG. 3 is a diagram depicting a Minkowski sum protocol between a client device, service provider computing system, and a third-party computing device, in accordance with some embodiments of the present disclosure. With reference to FIG. 1, those processes performed by the client device 104 may be performed by the comparison software 114, and processes performed by the service provider computing system may be performed by the comparison engine 118. It will be appreciated that an actual implementation of the Minkowski sum protocol may involve additional computations depending on the particular characteristic to be computed. More detailed protocols are described in relation to FIGS. 3 and 4. The process may begin at block 302.

At block 302, the client device 104 obtains an object file. The object file may be a three-dimension array of voxels representing an object capable of being fabricated by a 3D printer. In some embodiments, the client device 104 converts the object file to a frequency domain representation at block 304 using, for example, an FFT algorithm.

Similarly, the third-party device 106 obtains a comparison file at block 306. The comparison file may describe a tool specification, a part specification for another part in an assembly, a minimum printable feature size, and others. The comparison file may be a tensor of the same order, e.g., a three-dimension array of voxels. Additionally, the third-party device 106 converts the comparison file to the frequency domain representation at block 308.

At block 310, the object file is encrypted using the public key of a public-private key pair. Any suitable homomorphic encryption technique may be used. Additionally, the client device 104 also sends the same public key to the third-party device 106. At block 312, the comparison file is encrypted by the third-party device 106 using the public key received from the client device 104.

Both the encrypted object file and the encrypted comparison file are sent to the service provider computing system 102. The client device 104 may also send a processing request to the service provider computing system 102. The processing request may identify a type of process to be performed or a type of characteristic to be identified. Additionally, the client device 104 may identify the third-party device 106 and/or the comparison file provided by the third-party device 106.

In response to the request, the service provider computing system 102, at block 314, computes the encrypted Minkowski sum of the encrypted object file and the encrypted comparison file. The encrypted Minkowski sum may be computed in the frequency domain as described above in relation to FIG. 2. The encrypted Minkowski sum is then sent to the client device 104 as a result file.

At block 316, the client device decrypts the result file using the private key. At block 318, the client device 104 converts the decrypted result file to the spatial domain, which is the convolution of the object file and the comparison file.

It will be appreciated that embodiments of the protocol 200 may include additional blocks not shown in FIG. 3 and that some of the blocks shown in FIG. 3 may be omitted. Additionally, the processes associated with blocks 302 through 318 may be performed in a different order than what is shown in FIG. 3. For example, as described above in relation to FIG. 2, the Minkowski sum may also be computed in the spatial domain. Additionally, the object file and the comparison file may be converted to the frequency domain by the service provider computing system 102 (in the encrypted domain) rather than by the client device 104 and the third-party device.

Figure 4:
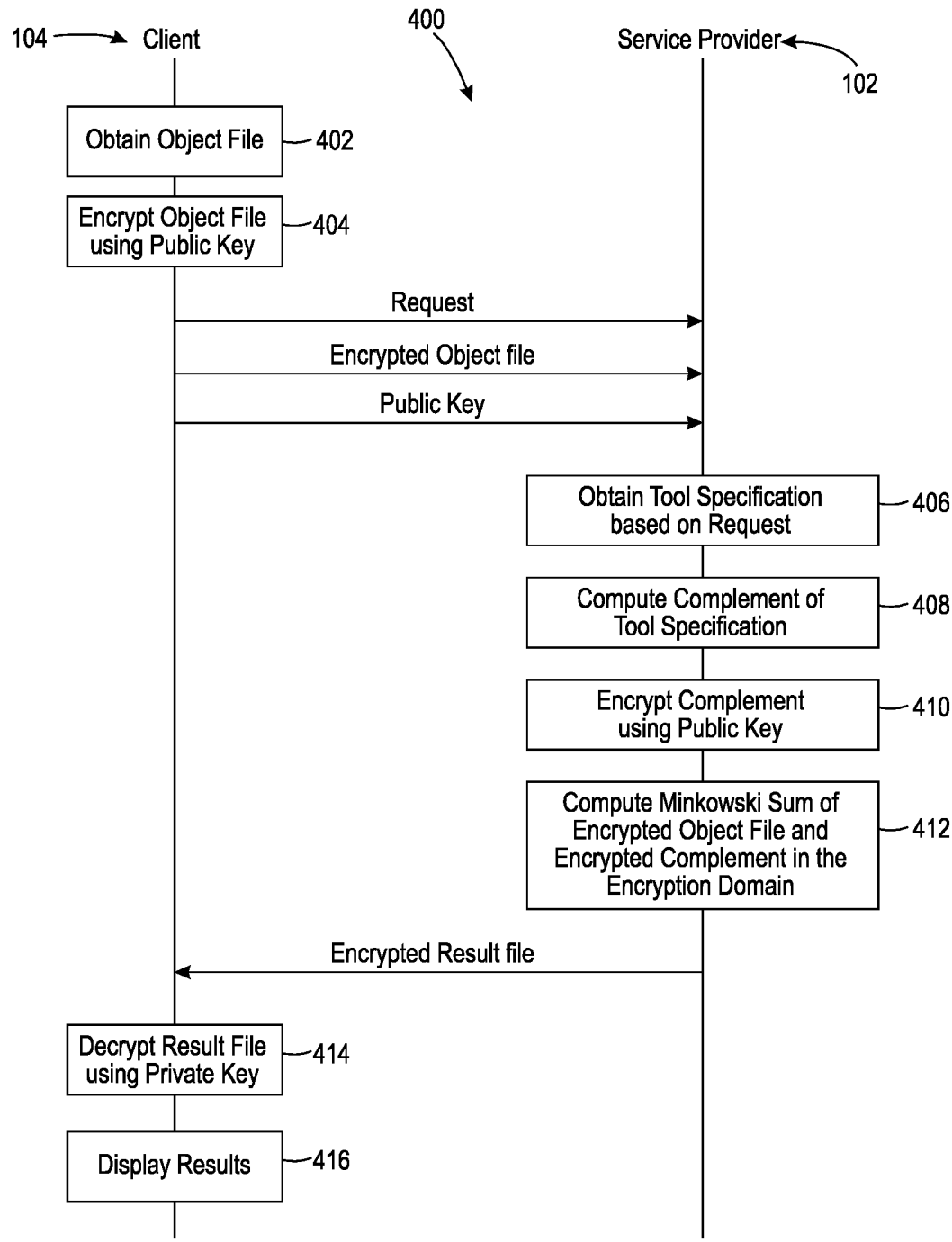
FIG. 4 is a diagram depicting a process of identifying exterior regions of a 3D printable part that are accessible by a tool using a Minkowski sum protocol, in accordance with some embodiments of the present disclosure.

FIG. 4 is a diagram depicting a process of identifying exterior regions of a 3D printable part that are accessible by a tool using a Minkowski sum protocol, in accordance with some embodiments of the present disclosure. With reference to FIG. 1, those processes performed by the client device 104 may be performed by the comparison software 114, and processes performed by the service provider computing system 102 may be performed by the comparison engine 118. The process of FIG. 4 uses the Minkowski sum protocol shown in FIGS. 2 and 3 as a primitive protocol, which is combined with the additional operations to achieve the processing goal identified in the request. The process may begin at block 402.

At block 402, the client device 104 obtains an object file at block 402. The object file may be three-dimension array of voxels representing an object capable of being fabricated by a 3D printer. In some embodiments, the client device 104 or the service provider computing system 102 may convert the object file to a frequency domain representation. For the sake of simplicity, steps involved in converting between the spatial domain and the frequency domain are not shown in FIG. 4. However, it will be appreciated that the Minkowski sum may be computed in the spatial domain or the frequency domain as described in relation to FIGS. 2 and 3.

At block 404, the object file is encrypted using the public key of a public-private key pair. Any suitable homomorphic encryption technique may be used.

The client device 104 then sends a processing request to the service provider computing system 102. The processing request may include an identifier that identifies the request as a request to find exterior regions of the object file that will be accessible by a tool. The request may also include an identifier that identifies the comparison file that represents the tool. For example, the identifier may identify a particular tool, a particular comparison file, or a particular third-party device from which the comparison file is to be received. Along with the request, the client device 104 also sends the encrypted object file and the public key used to encrypt the object file.

In response to the request, the service provider computing system 102 obtains, at block 406, the tool specification, i.e., the comparison file that describes the tool specification for the relevant tool identified in the request. For example, the tool may be a drill, a lathe, a Dremel kit, and others. With reference to FIG. 1, the tool specification may be obtained from a data storage device 116 of the service provider computing system 102 or from a third-party computing device 106.

At block 408, the service provider computing system 102 computes the complement of the tool specification, i.e., the inverse of the tool specification. For example, filled voxels in the tool specification would be empty in the complement and empty voxels in the tool specification would be filled in the complement.

At block 410, the service provider computing system 102 encrypts the complement of the tool specification using the public key received from the client device 104.

At block 412, the service provider computing system 102 computes the encrypted Minkowski sum of the encrypted object file and the encrypted complement of the tool specification. As explained above, the encrypted Minkowski sum may be computed in the frequency domain or the spatial domain. If computed in the frequency domain, the object file may be converted to the frequency domain by the client device 104 or the service provider computing system 102. The encrypted Minkowski sum, referred to herein as the result file, is then sent to the client device 104.

At block 414, the client device 104 decrypts the result file using the private key. In some embodiments, the client device 104 may also convert the decrypted result file to the spatial domain if not already in the spatial domain. In this embodiment, the result file identifies those regions in the exterior of the part described by the 3D object file that are accessible by the tool described by the tool specification.

At block 416, the client device 104 displays the results. For example, the 3D object model may be displayed in a GUI of the client device. In some embodiments, the results file can be used to modify the displayed 3D object model to highlight or otherwise identify those areas that are accessible or inaccessible by the tool.

It will be appreciated that embodiments of the protocol 400 may include additional blocks not shown in FIG. 4 and that some of the blocks shown in FIG. 4 may be omitted. Additionally, the processes associated with blocks 402 through 416 may be performed in a different order than what is shown in FIG. 4.

Figure 5:
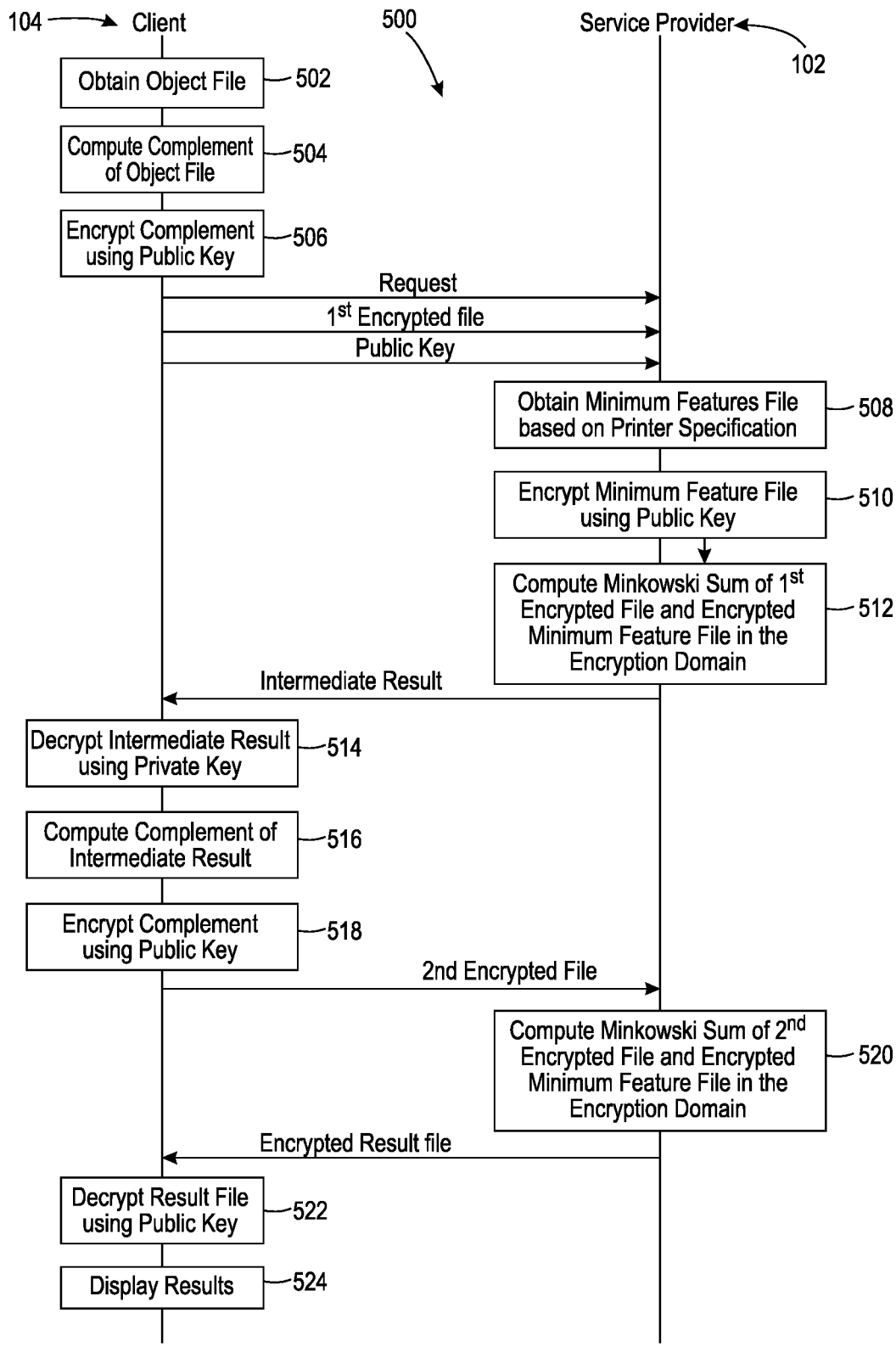
FIG. 5 is a diagram depicting a process of finding unprintable features of a part using a Minkowski sum protocol, in accordance with some embodiments of the present disclosure.

FIG. 5 is a diagram depicting a process of finding unprintable features of a part using a Minkowski sum protocol, in accordance with some embodiments of the present disclosure. With reference to FIG. 1, those processes performed by the client device 104 may be performed by the comparison software 114, and processes performed by the service provider computing system 102 may be performed by the comparison engine 118. The process of FIG. 5 uses the Minkowski sum protocol shown in FIGS. 2 and 3 as a primitive protocol, which is combined with the additional operations to achieve the processing goal identified in the request. The process may begin at block 502.

At block 502, the client device 104 obtains an object file. The object file may be three-dimension array of voxels representing an object capable of being fabricated by a 3D printer. In some embodiments, the client device 104 or the service provider computing system 102 may convert the object file to a frequency domain representation. For the sake of simplicity, steps involved in converting between the spatial domain and the frequency domain are not shown in FIG. 4. However, it will be appreciated that the Minkowski sum may be computed in the spatial domain or the frequency domain as described in relation to FIGS. 2 and 3.

At block 504, the client device 104 computes the complement of the object file.

At block 506, the client device 104 encrypts the complement of the object file using the public key of a public-private key pair. Any suitable homomorphic encryption technique may be used.

The client device 104 then sends a processing request to the service provider computing system 102. The processing request may include an identifier that identifies the request as a request to find unprintable features in the object file, i.e., regions of the object file that are too small to be printed. In this embodiment, the comparison file may be referred to as a minimum printable feature file, which describes a smallest printable feature according to the specifications applicable to the identified 3D printer. Accordingly, the request may also include an identification of a particular 3D printer or a minimum printable feature size. Along with the request, the client device 104 also sends the encrypted complement of the object file (referred to in FIG. 5 as the first encrypted file) and can also send the public key used to encrypt the file.

In response to the request, the service provider computing system 102 obtains, at block 508, the minimum printable feature file i.e., the comparison file that describes the minimum printable feature for the 3D printer identified in the request. The minimum printable feature file may be a tensor with components arranged to form a shape (e.g., circle, sphere, square, cube, etc.) centered at the origin and having a diameter equal to the size of the minimum printable feature. With reference to FIG. 1, the minimum printable feature file may be obtained from a data storage device 116 of the service provider computing system 102 or from a third-party computing device 106. Additionally, the minimum printable feature file may be generated based on a description of the minimum printable feature size. For example, if the minimum printable feature size is one millimeter, the minimum printable feature file may be generated by creating a tensor that describes a sphere with a diameter of one millimeter centered on the origin.

At block 510, the service provider computing system 102 encrypts the minimum feature file using the public key received from the client device 104.

At block 512, the service provider computing system 102 computes the encrypted Minkowski sum of the first encrypted file and the encrypted minimum feature file. As explained above, the encrypted Minkowski sum may be computed in the frequency domain or the spatial domain. If computed in the frequency domain, the first encrypted file may be converted to the frequency domain by the client device 104 or the service provider computing system 102. The encrypted Minkowski sum generated at block 512 is referred to herein as the intermediate result. The intermediate result is sent to the client device 104.

At block 514, the client device 104 decrypts the intermediate result using the private key. In some embodiments, the client device 104 may also convert to the decrypted intermediate result to the spatial domain if not already in the spatial domain.

At block 516, the client device 104 computes the complement of the decrypted intermediate result.

At block 518, the client device 104 encrypts the complement of the decrypted intermediate result to generate an additional file, referred to herein as the second encrypted file. The second encrypted file is sent to the service provider computing system 102.

At block 520, the service provider computing system 102 computes the encrypted Minkowski sum of the second encrypted file and the encrypted minimum feature file. As explained above, the encrypted Minkowski sum may be computed in the frequency domain or the spatial domain. The encrypted Minkowski sum generated at block 520 is referred to herein as the result file. The encrypted result file is sent to the client device 104.

At block 522, the client device 104 decrypts the result file using the private key. In some embodiments, the client device 104 may also convert the decrypted result file to the spatial domain if not already in the spatial domain. In this embodiment, the result file identifies those features of the part described by the 3D object file that are smaller than the minimum printable feature size applicable to a specific 3D printer.

At block 524, the client device 104 displays the results. For example, the 3D object model may be displayed in a GUI of the client device. In some embodiments, the results file can be used to modify the displayed 3D object model to highlight or otherwise identify those features that are below the minimum printable feature size.

It will be appreciated that embodiments of the protocol 500 may include additional blocks not shown in FIG. 5 and that some of the blocks shown in FIG. 5 may be omitted. Additionally, the processes associated with blocks 502 through 524 may be performed in a different order than what is shown in FIG. 5.

Figure 6:
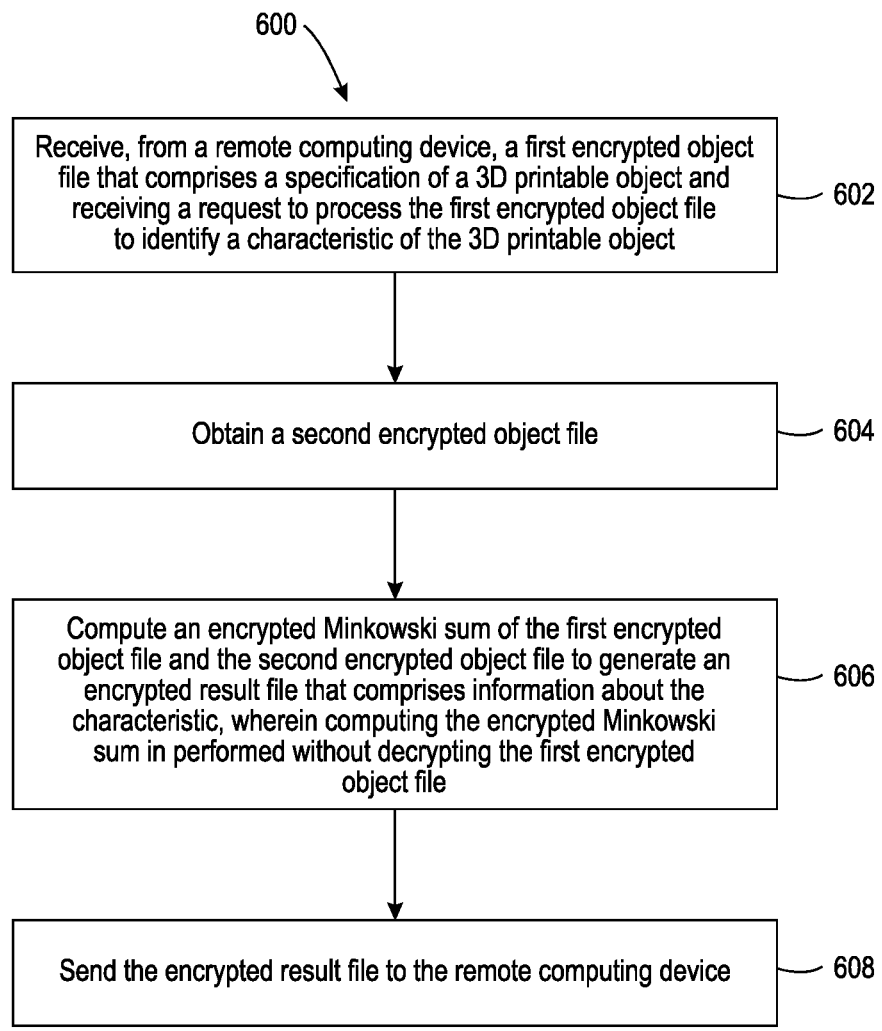
FIG. 6 is a process flow diagram for a method of processing a 3D object model in a privacy-preserving manner, in accordance with embodiments of the present disclosure.

FIG. 6 is a process flow diagram for a method of processing a 3D object model in a privacy-preserving manner, in accordance with embodiments of the present disclosure. The method 600 may be performed by hardware or a combination of hardware and software. For example, with reference to FIG. 1, the method 600 may be performed by the comparison engine 118 residing on the service provider computing system 102. The method may begin at block 602.

At block 602, an encrypted object file and a request to process the encrypted object file is received from a remote computing device. The encrypted object file includes a specification of a 3D printable object, which may be in the form of a three-dimensional tensor (e.g., array of voxels). The request is to process the encrypted object file to identify a characteristic of the 3D printable object. Blocks 604, 606, and 608 may be performed in response to the request.

At block 604, an encrypted comparison file is obtained. The comparison file may be received from a local storage device or a remote computing device of a third party. The comparison file may be encrypted using a homomorphic encryption key received from the remote computing device that sent the request. The comparison file may also be received in encrypted form from the third party. In some embodiments, the comparison file is also converted to a frequency domain representation before or after being encrypted.

At block 606, an encrypted Minkowski sum of the encrypted object file and the encrypted comparison file is computed to generate an encrypted result file that includes information about the characteristic, wherein computing the encrypted Minkowski sum is performed without decrypting the encrypted object file. The Minkowski sum may be performed in the spatial domain or the frequency domain. The characteristic may vary depending on the nature of the comparison file and the other computations performed in accordance with an embodiment.

At block 608, the encrypted result file is sent to the remote computing device. Additionally, depending on the details of a particular implementation, the encrypted result file may be converted to the spatial domain before being returned to the remote computing device.

It will be appreciated that embodiments of the method 600 may include additional blocks not shown in FIG. 6 and that some of the blocks shown in FIG. 6 may be omitted. For example, depending on the type of analysis to be performed, the method 600 may include one or more additional rounds of receiving files from the remote computing device and returning results before a final result is obtained. The processes associated with blocks 602 through 608 may be performed in a different order than what is shown in FIG. 6.

Figure 7:
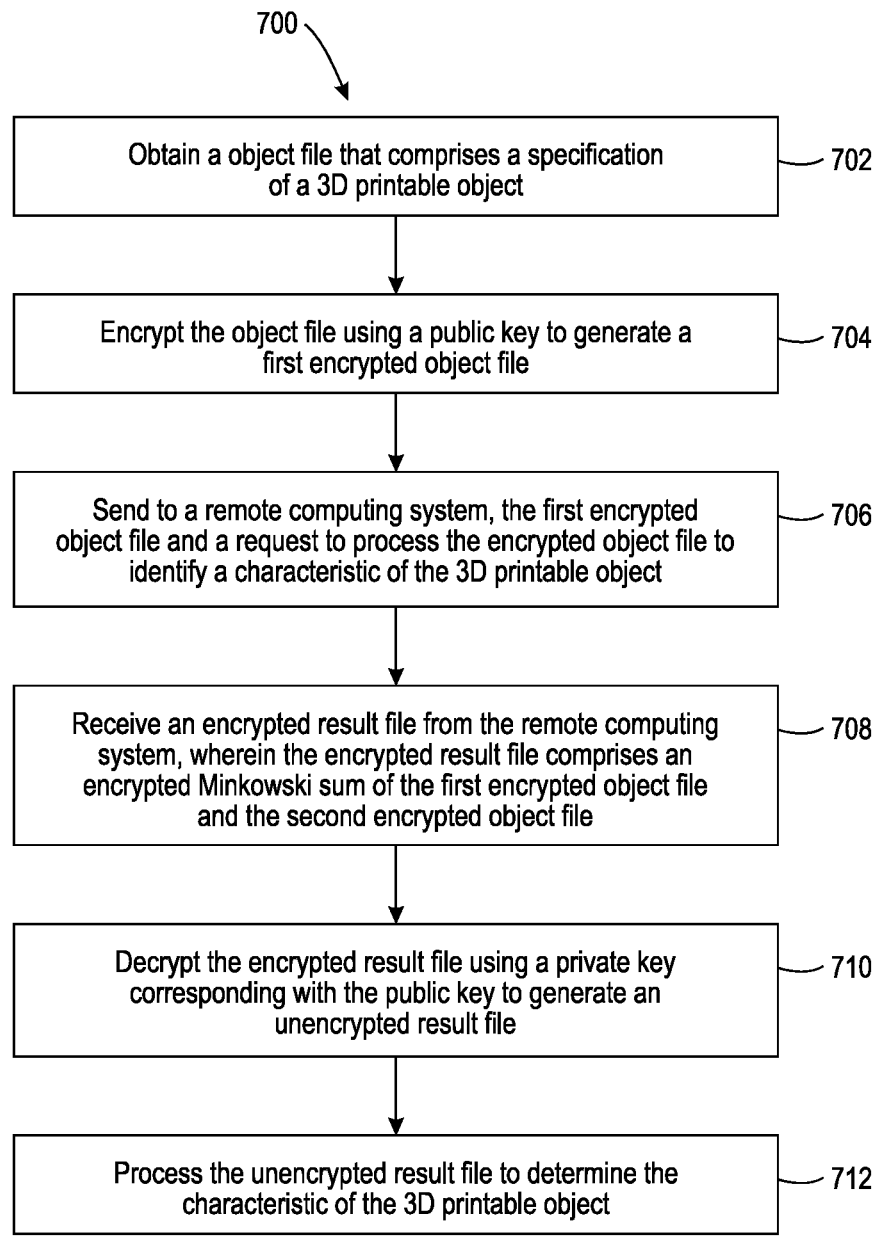
FIG. 7 is a process flow diagram for a method of processing a 3D object model in a privacy-preserving manner, in accordance with embodiments of the present disclosure.

FIG. 7 is a process flow diagram for a method of processing a 3D object model in a privacy-preserving manner, in accordance with embodiments of the present disclosure. The method 700 may be performed by hardware or a combination of hardware and software. For example, with reference to FIG. 7, the method 700 may be performed by the comparison software 114 residing on the client device 104. The method may begin at block 702.

At block 702, an object file that includes a specification of a 3D printable object is obtained. The encrypted object file includes a specification of a 3D printable object, which may be in the form of a three-dimensional tensor (e.g., array of voxels). The object file may be obtained from storage or may be generated from an object model, for example. The object file may also be converted to a frequency domain representation depending on the protocol details of a particular implementation.

At block 704, the object file is encrypted using a public key to generate an encrypted object file. The public key may be part of a public-private key pair generated in accordance with a homomorphic encryption technique. The public key is kept confidential and not shared with the remote computing system.

At block 706, the encrypted object file and a request to process the encrypted object file to identify a characteristic of the 3D printable object are sent to a remote computing system. Additionally, in some embodiments, the public key is also sent to the remote computing system so that the remote computing system is able to encrypt the comparison file to be used for the Minkowski sum computation. In some embodiments, the public key is sent to a third-party computing device, which is to provide the encrypted comparison file to the remote computing system.

At block 708, an encrypted result file is received from the remote computing system. The encrypted result file includes an encrypted Minkowski sum of the encrypted object file and an encrypted comparison file. Additionally, the encrypted result file is generated by the remote computing system in the encrypted domain.

At block 710, the encrypted result file is decrypted using a private key corresponding with the public key to generate an unencrypted result file.

At block 712, the unencrypted result file is processed to determine the characteristic of the 3D printable object. Processing the unencrypted result file may include converting the result file from the frequency domain to the spatial domain. Processing the unencrypted result file may also include displaying the information contained result file, generating a 3D visual display of the result file, and/or using the result file to alter a 3D visual display of the corresponding object model.

It will be appreciated that embodiments of the method 700 may include additional blocks not shown in FIG. 7 and that some of the blocks shown in FIG. 7 may be omitted. For example, depending on the type of analysis to be performed, the method 700 may include one or more additional rounds of sending and receiving files to and from the remote computing system before a final result is obtained. The processes associated with blocks 702 through 712 may be performed in a different order than what is shown in FIG. 7.

Figure 8:
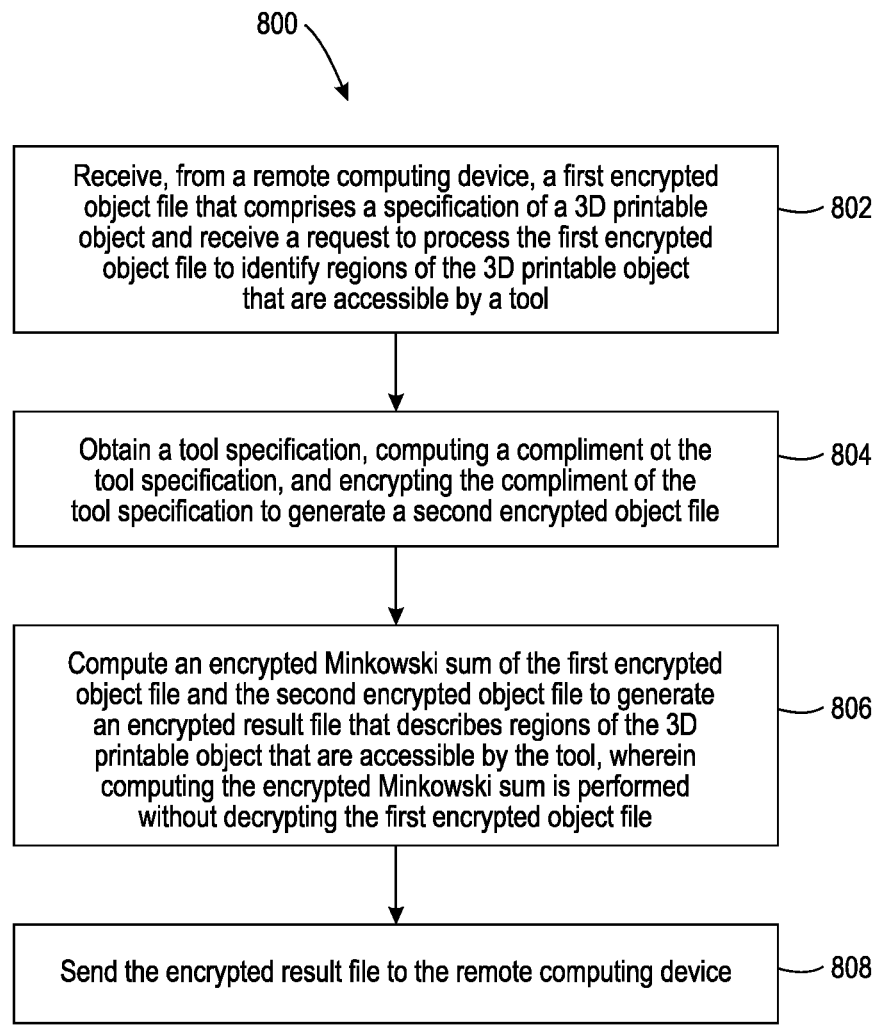
FIG. 8 is a process flow diagram for a method of identifying exterior regions of a 3D printable part that are accessible by a tool, in accordance with embodiments of the present disclosure.

FIG. 8 is a process flow diagram for a method of identifying exterior regions of a 3D printable part that are accessible by a tool, in accordance with embodiments of the present disclosure. The method 800 may be performed by hardware or a combination of hardware and software. For example, with reference to FIG. 1, the method 800 may be performed by the comparison engine 118 residing on the service provider computing system 102. Additionally, it will be appreciated that the method 800 may use the Minkowski sum protocol described in relation to FIGS. 6 and 7 as a primitive protocol. According, the details described in relation to FIGS. 6 and 7 may also be applied to the method 800, depending on the design details of a specific implementation. The method may begin at block 802.

At block 802, an encrypted object file and a request to process the encrypted object file are received from a remote computing device. The encrypted object file includes a specification of a 3D printable object. The request is to process the encrypted object file to identify regions of the 3D printable object that are accessible by a tool. Blocks 804, 806, and 808 may be performed in response to the request.

At block 804, a tool specification is obtained, a complement of the tool specification is computed, and the complement of the tool specification is encrypted to generate an encrypted comparison file.

At block 806, an encrypted Minkowski sum of the encrypted object file and the encrypted comparison file is computed to generate an encrypted result file that describes regions of the 3D printable object that are accessible by the tool. Computing the encrypted Minkowski sum is performed without decrypting the encrypted object file.

At block 808, the encrypted result file is sent to the remote computing device.

It will be appreciated that embodiments of the method 800 may include additional blocks not shown in FIG. 8 and that some of the blocks shown in FIG. 8 may be omitted. The processes associated with blocks 802 through 808 may be performed in a different order than what is shown in FIG. 8.

Figure 9:
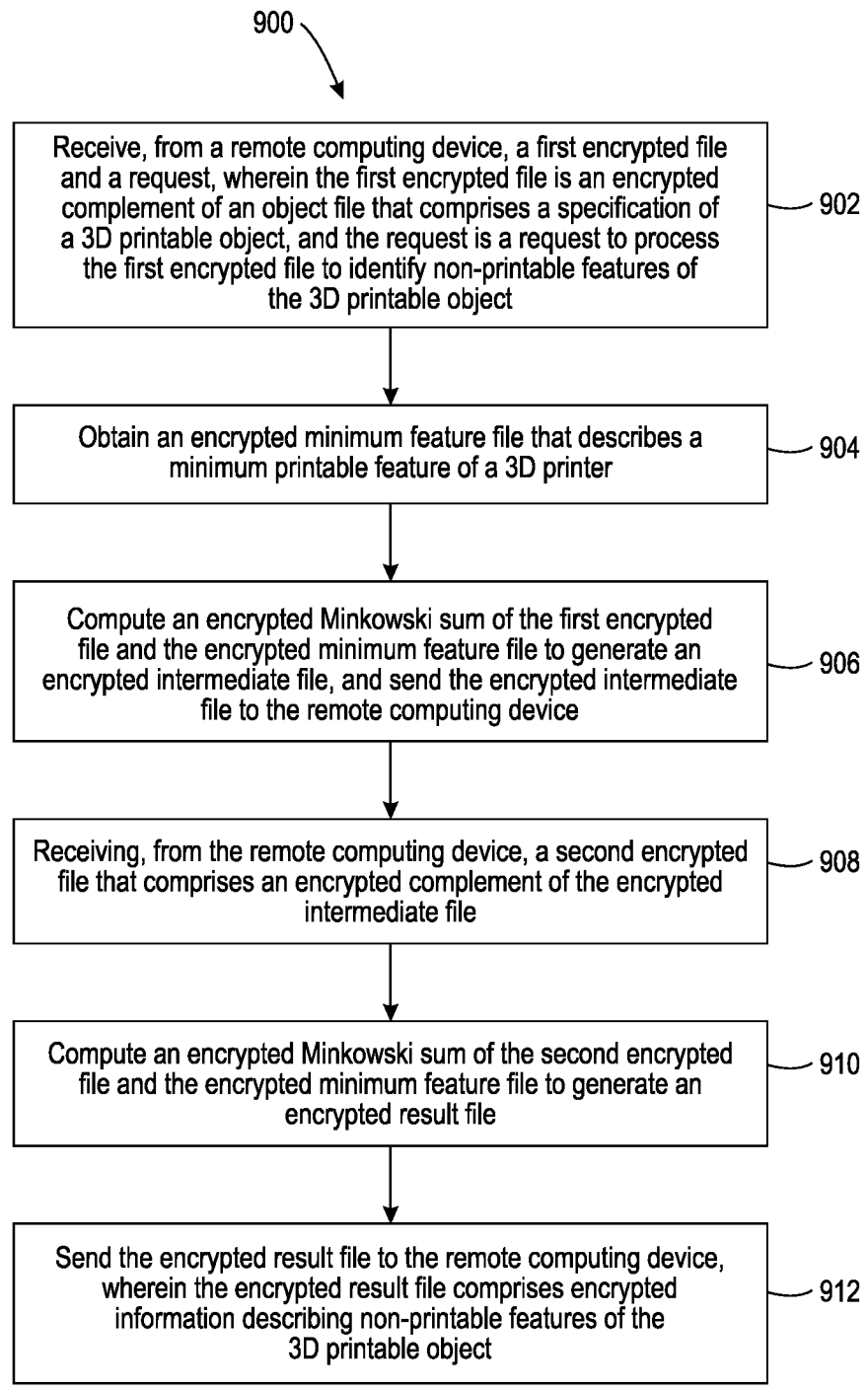
FIG. 9 is a process flow diagram for a method of identifying unprintable features of 3D printable part, in accordance with embodiments of the present disclosure.

FIG. 9 is a process flow diagram for a method of identifying unprintable features of 3D printable part, in accordance with embodiments of the present disclosure. The method 900 may be performed by hardware or a combination of hardware and software. For example, with reference to FIG. 1, the method 900 may be performed by the comparison engine 118 residing on the service provider computing system 102. Additionally, it will be appreciated that the method 900 may use the Minkowski sum protocol described in relation to FIGS. 6 and 7 as a primitive protocol. According, the details described in relation to FIGS. 6 and 7 may also be applied to the method 900, depending on the design details of a specific implementation. The method may begin at block 902.

At block 902, a first encrypted file and a request are received from a remote computing device. The first encrypted file is an encrypted complement of an object file that includes a specification of a 3D printable object. The request is to process the first encrypted file to identify non-printable features of the 3D printable object. Blocks 906 through 912 may be performed in response to the request.

At block 904, an encrypted minimum feature file that describes a smallest printable feature of a 3D printer is obtained.

At block 906, a first encrypted Minkowski sum of the first encrypted file and the encrypted minimum feature file is computed to generate an encrypted intermediate file, and the encrypted intermediate file is sent to the remote computing device.

At block 908, a second encrypted file is received from the remote computing device. The second encrypted file includes an encrypted complement of the encrypted intermediate file.

At block 910, a second encrypted Minkowski sum of the second encrypted file and the encrypted minimum feature file is computed to generate an encrypted result file.

At block 912, the encrypted result file is sent to the remote computing device. The encrypted result file includes encrypted information that describes non-printable features of the 3D printable object.

It will be appreciated that embodiments of the method 900 may include additional blocks not shown in FIG. 9 and that some of the blocks shown in FIG. 9 may be omitted. The processes associated with blocks 902 through 908 may be performed in a different order than what is shown in FIG. 9.

Figure 10:
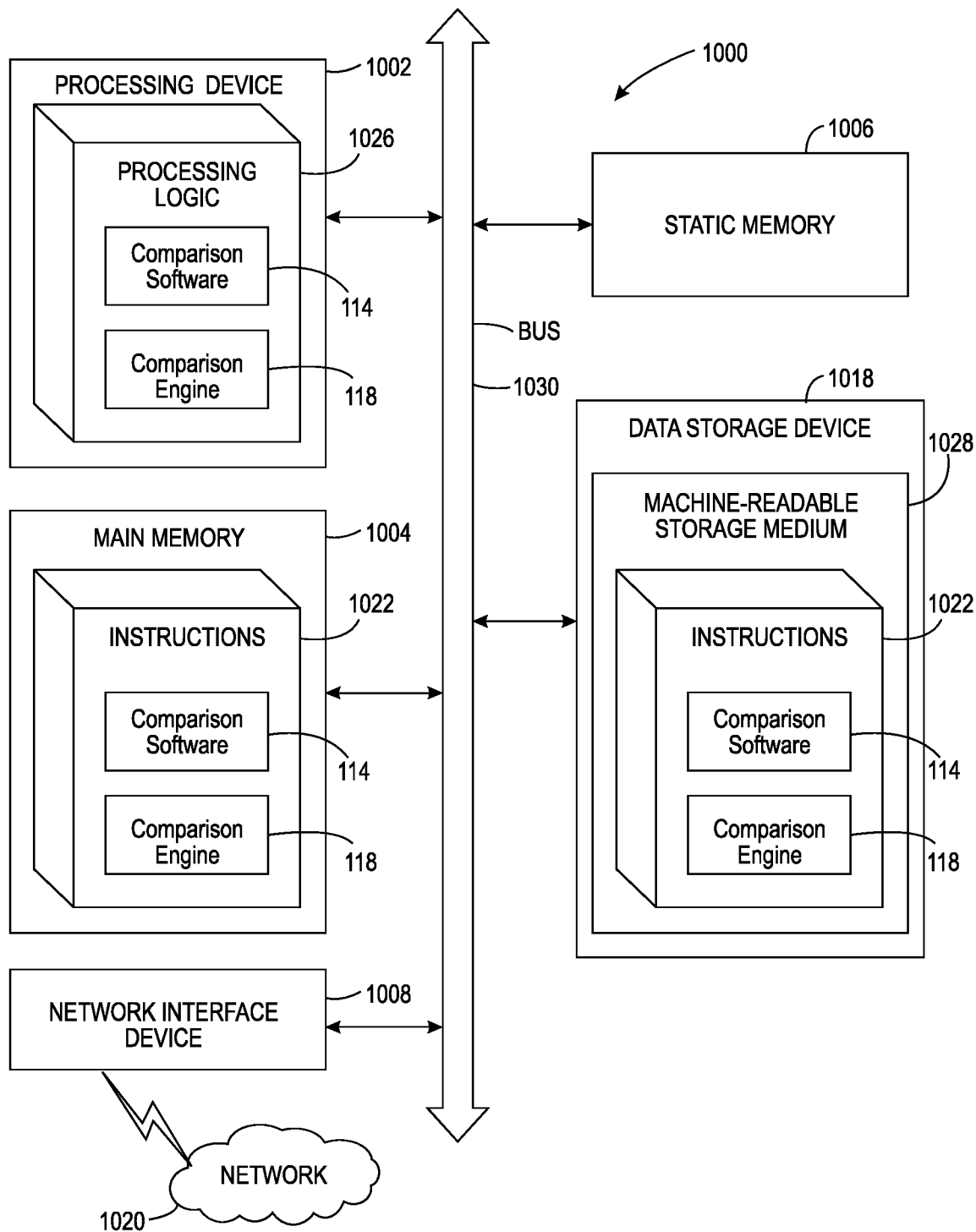
FIG. 10 illustrates a diagrammatic representation of a machine in the example form of a computer system within which a set of instructions or processing logic, for causing the machine to perform any one or more of the methodologies discussed herein, may be executed.

FIG. 10 illustrates a diagrammatic representation of a machine in the example form of a computer system 1000 within which a set of instructions 1022 or processing logic 1026, for causing the machine to perform any one or more of the methodologies discussed herein, may be executed. In various embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In embodiments, the computer system 1000 may be representative of a service provider computing system 102, a client computing device 104, or other computing device or system.

The exemplary computer system 1000 includes a processing device 1002, a main memory 1004 (e.g., read-only memory (ROM), flash memory, dynamic random-access memory (DRAM), a static memory 1006 (e.g., flash memory, static random-access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may execute processing logic 1026 for performing any of the operations and processes described herein.

The data storage device 1018 may include a machine-readable storage medium 1028, on which is stored one or more set of instructions 1022 (e.g., software) embodying any one or more of the operations and processes described herein. The instructions 1022 may also reside, completely or at least partially, within the main memory 1004 or within the processing device 1002 during execution thereof by the computer system 1000; the main memory 1004 and the processing device 1002 also constituting machine-readable storage media. The instructions 1022 may further be transmitted or received over a network 1020 via the network interface device 1008. The processing logic 1026 and/or the instructions 1022 may include the comparison software 114 and/or the comparison engine 118, which are configured to enable the processing device 1002 to perform any of the tasks described herein for processing an object model or object file in a privacy-preserving manner.

While the machine-readable storage medium 1028 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method of finding non-printable features in a three-dimensional (3D) printable object, comprising:
receiving, from a remote computing device, a first encrypted file and a request, wherein the first encrypted file is an encrypted complement of an object file that comprises a specification of a 3D printable object, and the request is a request to process the first encrypted file to identify non-printable features of the 3D printable object;

responsive to the request:
obtaining an encrypted minimum feature file that describes a smallest printable feature of a 3D printer;
computing a first encrypted Minkowski sum of the first encrypted file and the encrypted minimum feature file to generate an encrypted intermediate file, and sending the encrypted intermediate file to the remote computing device;
receiving, from the remote computing device, a second encrypted file that comprises an encrypted complement of the encrypted intermediate file;
computing, by a processing device, a second encrypted Minkowski sum of the second encrypted file and the encrypted minimum feature file to generate an encrypted result file; and
sending the encrypted result file to the remote computing device, wherein the encrypted result file comprises encrypted information that describes the non-printable features of the 3D printable object.

2. The method of claim 1, wherein computing the first encrypted Minkowski sum comprises computing a frequency-domain element-wise product of the first encrypted file and the encrypted minimum feature file, and wherein the encrypted intermediate file is an encrypted frequency-domain representation of the first encrypted Minkowski sum.

3. The method of claim 1, wherein computing the first encrypted Minkowski sum comprises:
computing a frequency-domain element-wise product of the first encrypted file and the encrypted minimum feature file; and
converting the first encrypted Minkowski sum to a spatial-domain representation, wherein the encrypted intermediate file is an encrypted spatial-domain representation of the first encrypted Minkowski sum.

4. The method of claim 1, wherein computing the first encrypted Minkowski sum comprises computing a spatial-domain element-wise summation of the first encrypted file and the encrypted minimum feature file.

5. The method of claim 1, wherein the first encrypted file, the second encrypted file, and the encrypted minimum feature file are encrypted using homomorphic encryption.

6. The method of claim 1, wherein obtaining the encrypted minimum feature file comprises:
retrieving a minimum feature file from a local storage device; and
encrypting the minimum feature file to generate the encrypted minimum feature file.

7. The method of claim 6, further comprising converting the minimum feature file to a frequency domain representation before encrypting the minimum feature file.

8. The method of claim 6, wherein encrypting the minimum feature file comprises encrypting the minimum feature file using an encryption key received from the remote computing device.

9. The method of claim 6, wherein obtaining the minimum feature file comprises:
receiving a specification of a minimum feature size from the remote computing device; and
generating the minimum feature file as a tensor comprising components arranged to form a shape having a diameter equal to the minimum feature size.

10. The method of claim 6, wherein obtaining the minimum feature file comprises:

receiving an identifier of a 3D printer from the remote computing device; and
retrieving the minimum feature file associated with the identifier from a local storage device.

11. A system for processing a three-dimensional (3D) object file in a privacy-preserving manner, comprising:
a memory;
a processing device operatively coupled to the memory, the processing device to:
receive, from a remote computing device, a first encrypted file and a request, wherein the first encrypted file is an encrypted complement of an object file that comprises a specification of a 3D printable object, and the request is a request to process the first encrypted file to identify non-printable features of the 3D printable object;
obtain an encrypted minimum feature file that describes a smallest printable feature of a 3D printer;
compute a first encrypted Minkowski sum of the first encrypted file and the encrypted minimum feature file to generate an encrypted intermediate file, and send the encrypted intermediate file to the remote computing device;
receive, from the remote computing device, a second encrypted file that comprises an encrypted complement of the encrypted intermediate file;
compute a second encrypted Minkowski sum of the second encrypted file and the encrypted minimum feature file to generate an encrypted result file; and
send the encrypted result file to the remote computing device, wherein the encrypted result file comprises encrypted information that describes the non-printable features of the 3D printable object.

12. The system of claim 11, wherein the first encrypted file, the second encrypted file, and the encrypted minimum feature file are encrypted using homomorphic encryption.

13. The system of claim 11, wherein to obtain the encrypted minimum feature file, the processing device is to:
obtain a minimum feature file from a local storage device; and
encrypt the minimum feature file to generate the encrypted minimum feature file using a homomorphic encryption key received from the remote computing device.

14. The system of claim 13, wherein the processing device is further to convert the minimum feature file to a frequency domain representation before encryption of the minimum feature file.

15. The system of claim 13, wherein to obtain the minimum feature file, the processing device is to:
receive a specification of a minimum feature size from the remote computing device; and
generate the minimum feature file as a tensor comprising components arranged to form a shape having a diameter equal to the minimum feature size.

16. A non-transitory computer-readable storage medium having instructions stored thereon that, when executed by a processing device, cause the processing device to:
receive, from a remote computing device, a first encrypted file and a request, wherein the first encrypted file is an encrypted complement of an object file that comprises a specification of a three-dimensional (3D) printable object, and the request is a request to process the first encrypted file to identify non-printable features of the 3D printable object;
obtain an encrypted minimum feature file that describes a smallest printable feature of a 3D printer;

compute a first encrypted Minkowski sum of the first encrypted file and the encrypted minimum feature file to generate an encrypted intermediate file, and send the encrypted intermediate file to the remote computing device;

receive, from the remote computing device, a second encrypted file that comprises an encrypted complement of the encrypted intermediate file;

compute, by the processing device, a second encrypted Minkowski sum of the second encrypted file and the encrypted minimum feature file to generate an encrypted result file; and send the encrypted result file to the remote computing device, wherein the encrypted result file comprises encrypted information that describes the non-printable features of the 3D printable object.

17. The non-transitory computer-readable storage medium of claim 16, wherein the first encrypted file, the second encrypted file, and the encrypted minimum feature file are encrypted using homomorphic encryption.

18. The non-transitory computer-readable storage medium of claim 16, wherein to obtain the encrypted minimum feature file, the instructions direct the processing device to:

obtain a minimum feature file from a local storage device; and encrypt the minimum feature file to generate the encrypted minimum feature file using a homomorphic encryption key received from the remote computing device.

19. The non-transitory computer-readable storage medium of claim 18, wherein the instructions further direct the processing device to convert the minimum feature file to a frequency domain representation before encryption of the minimum feature file.

20. The non-transitory computer-readable storage medium of claim 18, wherein to obtain the minimum feature file, the instructions direct the processing device to:

receive a specification of a minimum feature size from the remote computing device; and generate the minimum feature file as a tensor comprising components arranged to form a shape having a diameter equal to the minimum feature size.

* * * * *